(12) United States Patent
Scott et al.

(10) Patent No.: US 11,131,011 B2
(45) Date of Patent: Sep. 28, 2021

(54) HOT-ROLLED OR COLD-ROLLED STEEL PLATE

(71) Applicant: ArcelorMittal, Luxembourg (LU)

(72) Inventors: Colin Scott, Saint Thomas-en-Royans (FR); Philippe Cugy, La Charite-sur-Loire (FR)

(73) Assignee: ARCELORMITTAL, Luxembourg (LU)

( * ) Notice: Subject to any disclaimer, the term of this patent is extended or adjusted under 35 U.S.C. 154(b) by 0 days.

(21) Appl. No.: 16/356,231

(22) Filed: Mar. 18, 2019

(65) Prior Publication Data

US 2019/0211428 A1 Jul. 11, 2019

Related U.S. Application Data

(63) Continuation of application No. 13/880,929, filed as application No. PCT/FR2011/052451 on Oct. 20, 2011, now abandoned.

(30) Foreign Application Priority Data

Oct. 21, 2010 (WO) ................ PCT/FR2010/052254

(51) Int. Cl.
| | |
|---|---|
| *C22C 38/04* | (2006.01) |
| *C21D 6/00* | (2006.01) |
| *C21D 8/04* | (2006.01) |
| *C21D 9/48* | (2006.01) |
| *C22C 38/02* | (2006.01) |
| *C22C 38/06* | (2006.01) |
| *C22C 38/08* | (2006.01) |
| *C22C 38/12* | (2006.01) |
| *C22C 38/16* | (2006.01) |
| *B32B 15/01* | (2006.01) |
| *C21D 8/00* | (2006.01) |
| *C22C 38/00* | (2006.01) |
| *C22C 38/46* | (2006.01) |
| *C22C 38/48* | (2006.01) |
| *C22C 38/50* | (2006.01) |
| *C22C 38/54* | (2006.01) |
| *C25D 7/06* | (2006.01) |
| *C21D 1/673* | (2006.01) |

(52) U.S. Cl.
CPC ............ *C22C 38/04* (2013.01); *B32B 15/013* (2013.01); *C21D 6/005* (2013.01); *C21D 8/005* (2013.01); *C21D 8/0426* (2013.01); *C21D 8/0436* (2013.01); *C21D 8/0463* (2013.01); *C21D 8/0473* (2013.01); *C21D 9/48* (2013.01); *C22C 38/001* (2013.01); *C22C 38/02* (2013.01); *C22C 38/06* (2013.01); *C22C 38/08* (2013.01); *C22C 38/12* (2013.01); *C22C 38/16* (2013.01); *C22C 38/46* (2013.01); *C22C 38/48* (2013.01); *C22C 38/50* (2013.01); *C22C 38/54* (2013.01); *C25D 7/0614* (2013.01); *C21D 1/673* (2013.01); *Y10T 29/49* (2015.01); *Y10T 428/12799* (2015.01)

(58) Field of Classification Search
CPC ...................................................... C22C 38/04
See application file for complete search history.

(56) References Cited

U.S. PATENT DOCUMENTS

| | | | |
|---|---|---|---|
| 5,647,922 A | 7/1997 | Kim et al. | |
| 6,358,338 B1 * | 3/2002 | Guelton | C21D 8/0205 |
| | | | 148/547 |
| 7,794,552 B2 | 9/2010 | Cugy et al. | |
| 7,799,148 B2 | 9/2010 | Scott et al. | |
| 7,892,654 B2 | 2/2011 | Hofmann et al. | |
| 7,976,650 B2 | 7/2011 | Drillet et al. | |
| 8,307,680 B2 | 11/2012 | Drillet et al. | |
| 8,394,213 B2 | 3/2013 | Meurer et al. | |
| 8,926,772 B2 | 1/2015 | Bouzekri et al. | |
| 2006/0278309 A1 * | 12/2006 | Bouzekri | B21B 3/02 |
| | | | 148/546 |
| 2008/0271823 A1 | 11/2008 | Hofmann et al. | |
| 2009/0010793 A1 | 1/2009 | Becker et al. | |
| 2012/0305139 A1 | 12/2012 | John et al. | |

FOREIGN PATENT DOCUMENTS

| | | |
|---|---|---|
| CA | 2597774 A1 | 8/2006 |
| CN | 101550515 B | 5/2012 |
| EP | 1067203 A1 | 1/2001 |
| JP | S6036647 A | 2/1985 |
| JP | H04259325 A | 9/1992 |
| JP | 2006528278 A | 12/2006 |
| JP | 2008538384 A | 10/2008 |
| JP | 2010501725 A | 1/2010 |
| RU | 2318882 C2 | 3/2008 |
| RU | 2354716 C2 | 5/2009 |
| RU | 2366727 C2 | 9/2009 |
| RU | 2366728 C1 | 9/2009 |
| WO | 9313233 A1 | 7/1993 |
| WO | 9526423 A1 | 10/1995 |
| WO | 9724467 A1 | 7/1997 |
| WO | 03025240 A1 | 3/2003 |
| WO | 2005019483 A1 | 3/2005 |
| WO | 2006056670 A2 | 6/2006 |
| WO | 2006077301 A1 | 7/2006 |
| WO | 2007074994 A1 | 7/2007 |
| WO | 2007075006 A1 | 7/2007 |
| WO | 2008007192 A2 | 1/2008 |

(Continued)

*Primary Examiner* — Jophy S. Koshy

(74) *Attorney, Agent, or Firm* — Davidson, Davidson & Kappel, LLC

(57) ABSTRACT

A hot-rolled or cold-rolled steel plate having a composition including, in weight percent: 0.6%≤C≤0.9%; 17%≤Mn≤22%; 0.2%≤Al≤0.9%; 0.2%≤Si≤1.1%; with 0.85%≤Al+Si≤1.6%; 1.2%≤Cu≤1.7%; S≤0.030%; P≤0.080%; N≤0.1%; 0<Nb≤0.25%; 0<V≤0.5%; 0<Ti≤0.5%; 0<Ni≤2%; trace amounts ≤Cr≤2% and B≤0.010% is provided. A remainder of the composition includes iron and impurities resulting from production of the steel plate. A method for manufacturing a steel plate and use of the steel plate in the automotive industry is also provided.

15 Claims, 1 Drawing Sheet

(56) References Cited

FOREIGN PATENT DOCUMENTS

| | | |
|---|---|---|
| WO | 2008078904 A1 | 7/2008 |
| WO | 2008078940 A1 | 7/2008 |
| WO | 2008078962 A1 | 7/2008 |
| WO | 2011054332 A2 | 5/2011 |

* cited by examiner

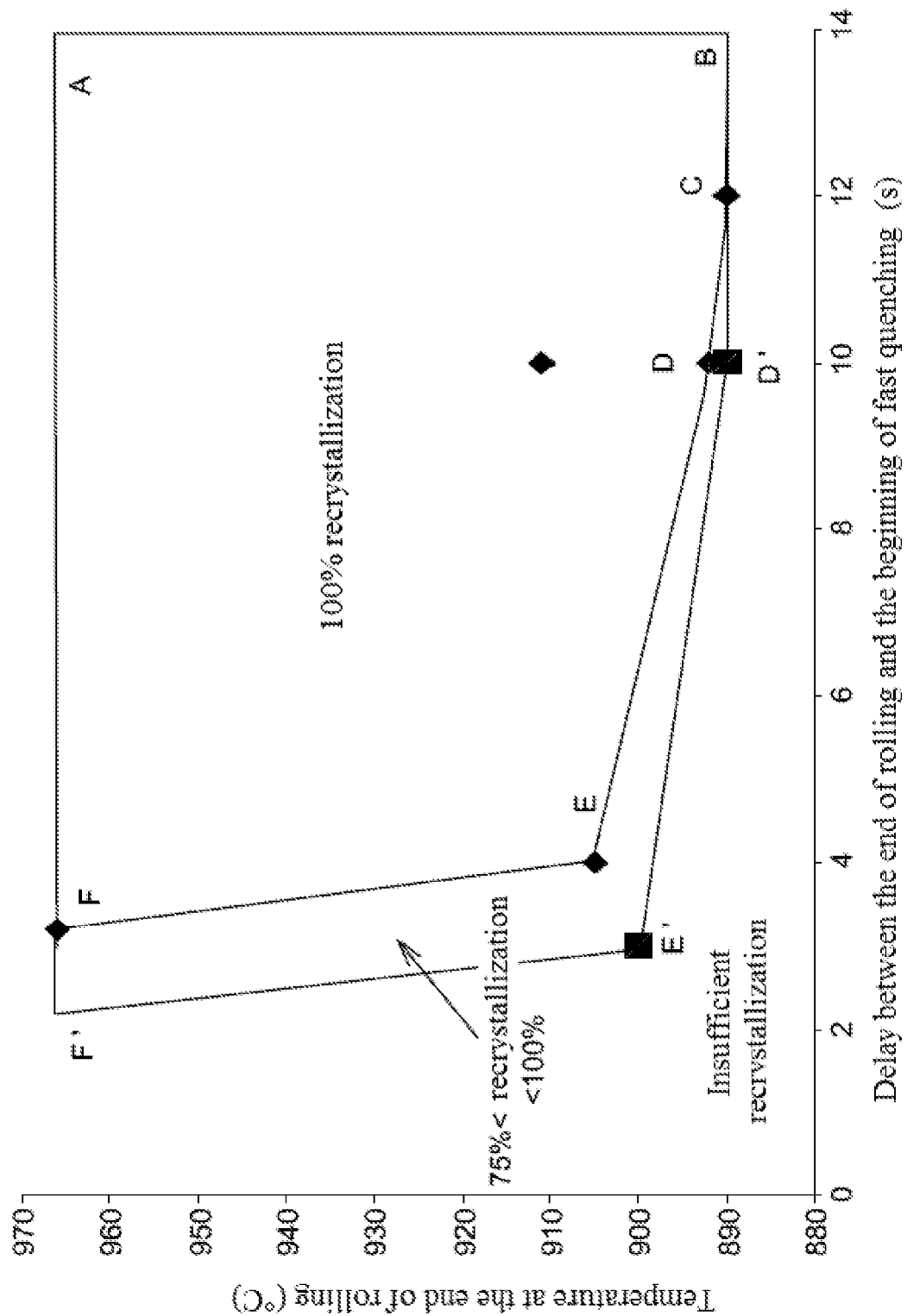

HOT-ROLLED OR COLD-ROLLED STEEL PLATE

CROSS-REFERENCE TO RELATED APPLICATIONS

This is a continuation of U.S. application Ser. No. 13/880,929 filed Apr. 22, 2013, which is a national stage of PCT/FR2011/052451 filed Oct. 20, 2011, which claims priority to PCT Application No. PCT/FR2010/052254, filed Oct. 21, 2010, the entire disclosures of which are hereby incorporated by reference herein.

The invention relates to metallurgy, and more particularly to hot-rolled or cold-rolled metal plates in iron-manganese steel which may be used in the automotive industry.

BACKGROUND

Austenitic Fe—Mn—C steels are used in the automotive industry for making structural parts with very high strength, notably in the form of hot-rolled or cold-rolled plates. They have the advantage, as compared with carbon steels used for the same uses, of being more lightweight, which allows appreciable energy savings during the use of the vehicle. This family of steels is also called TWIP (Twinning Induced Plasticity) steels. Their mechanical strength is high (tensile strength Rm>1,000 MPa) and their ductility is considerable (elongation at break A >50%). They have excellent formability and a large capacity in absorbing energy in the case of impacts. This makes them particularly suitable for the manufacturing of safety and structural parts of vehicles.

Their Mn content is of at least 10%, often of the order of 15 to 35%, their C content may range for example up to 1.5%, and other elements such as Al, Si, Cu, Ti, W, Mo, Cr, Ni, Nb, V . . . may be present in significant amounts. These contents are given as weight percentages as will be all the contents mentioned in the subsequent text.

The favorable mechanical properties of these steels are due:
- to their stable austenitic structure at all temperatures between −100 and +1200° C.;
- to their high work-hardening rate (n>0.4) thanks to a strong level of mechanical twinning.

At room temperature, the stack fault energy of the steels is sufficiently low for having mechanical twinning compete with the slipping of dislocations. The twinning density increasing with deformation, the free path of dislocations rapidly drops. It is this mechanism by which the favorable mechanical properties mentioned above may be obtained.

Among the documents describing such plates, the following may be mentioned.

EP1067203 describes Fe—Mn plates manufactured by direct casting of thin strips. The described compositions are very wide, in particular the Al content may range up to 6%, the Cu content up to 5%, the Si content up to 2.5%, but low Si, Al and Cu contents are preferred. These steels have remarkable mechanical properties when their elaboration method (casting in thin strips with possible hot-rolling, preferably in line with casting, cold-rolling and recrystallization annealing) is observed. But casting in thin strips is a method difficult to apply and not very adapted to mass production as this would be desirable for products intended for automobiles.

WO03/025240 describes Fe—Mn plates with high strength for welded tubes, including 10 to 40% of Mn, up to 2% of C, up to 5% of Si, up to 5% of Al, up to 5% of Cu. Many other alloy elements may also be present. However, low Al contents (less than 0.1% and preferably 0.01% at most), low contents of Cu (less than 1%), of Si (less than 1%, preferably less than 0.5%) are preferred, in particular for Al which, at high contents, risks forming nitrides and thereby promoting formation of cracks during hot transformations. Low Si contents are also preferred, since Si may promote the formation of martensite during cold deformation, and is unfavorable for pickling the material and the weldability thereof.

WO2005/019483 describes hot-rolled Fe—C—Mn steel plates with Rm greater than 900 MPa and high elongation at break (Rm×A %>45,000). The C content is narrowed down to 0.5-0.7% and the Mn content to 17-24%. The Al content is maintained at a very low level, 0.050% at most, there again in order to avoid formation of Al nitrides. The significant presence of Si and Cu is possible, but not particularly desired.

WO2006/056670 describes plates comparable with those of the previous documents with C contents a little greater (0.85-1.05%) and more narrowed Mn contents from 16 to 19%. Their strength Rm is greater than 1,200 MPa and its product with A % is greater than 65,000 MPA %. But these high properties are obtained on hot-rolled plates only at the expense of a total absence of precipitated iron carbides and of an average grain size of at most 10 μm. Fast quenching after hot rolling followed by winding at low temperature (<400° C.) is required for this purpose. And if the composition and treatment conditions are not well observed, there is a risk of forming cementite in the segregated areas and in the grain boundaries, whence insufficiently homogeneous properties in the product.

WO2006/077301 describes hot-rolled and then cold-rolled and then annealed Fe—C—Mn steel plates, intended to resist deferred cracking, i.e. to the occurrence of cracks after their shaping. For this purpose, element(s) which will be used as hydrogen traps, are introduced into the steel, preventing this element of being concentrated at the austenitic grain boundaries. V, Ti, Nb, Cr and Mo may be used, together or separately, for this purpose. V is particularly effective. The composition of the steel and the heat treatments are adjusted for obtaining the desired high mechanical properties and resistance to deferred cracking, in particular with the purpose of obtaining carbides for which the average size is from 5 to 25 nm and located in majority in an intragranular position.

WO2008/007192 describes plates comparable with those of the previous document, which further may be coated with Zn or a Zn alloy under conditions allowing the formation of a layer rich in Fe and Mn at the metal/coating interface.

WO93/13233 describes austenitic Fe—Mn plates with Mn=15-35%, C=0-1.5%, preferably 0-0.7%, Al=0.1-6%, Si≤0.6%, with Mn and Al contents simultaneously located in a determined range. They have high strength, high formability and high weldability. Documents WO95/26423, WO97/24467 describes comparable plates. Other elements may be present in the very vast ranges of contents, for example up to 5% Cu. WO2007/074994 describes comparable steels (which may however only contain 5% Mn) intended to be galvanized in order to improve their resistance to corrosion in a saline medium.

WO2008/078962 describes Fe—Mn plates containing up to only 0.5% of C, and other elements among which possibly Cu up to 10%. They contain residual austenite and martensite. They have good toughness but their tensile strength, although relatively high, and their elongation at break, are however less than those of the materials described earlier.

WO2007/075006 describes hot-rolled or cold-rolled Fe—Mn plates, intended to be coated and having good surface quality. They contain 0.2-1.5% of C, 10-25% of Mn, 0.01-3% of Al and 0.005-2% of Si.

WO2008/078904 describes hot-rolled or cold-rolled Fe—Mn plates with high mechanical properties and good surface quality, containing 0.2-1.5% of C, 10-25% of Mn, 0.3-3.0% of Al and no Si.

WO2008/078940 describes hot-rolled or cold-rolled Fe—Mn plates with high mechanical properties and good surface quality, containing 0.2-1.5% of C, 10-25% of Mn, 0.3-3.0% of Al, and at least one element from among Si, Ti and Nb. They are distinguished by good capacity in absorbing impacts.

BRIEF SUMMARY OF THE INVENTION

However, this family of steels rich in Mn or even also in C, because they may attain high stress and deformation levels, have significant sensitivity to different forms of damaging by hydrogen, notably to corrosion under stress. The documents which have just been mentioned, in particular, do not propose any solution to this problem.

An object of the invention is to provide the users, notably automobile manufacturers, with Fe—Mn steels in the form of hot-rolled or cold-rolled plates, and optionally electro-galvanized, not only having the desired high mechanical properties, such as tensile strength Rm greater than or equal to 850 MPa and an elongation at break greater than or equal to 50% on a hot-rolled or annealed crude plate, and a large capacity in plastic deformation, but also having high resistance to corrosion under stress both in an aqueous medium and in a saline medium.

The present invention provides a hot-rolled or cold-rolled steel plate characterized in that its composition is, in weight percentages:

0.6%≤C≤0.9%;
17%≤Mn≤22%;
0.2%≤Al≤0.9%;
0.2%≤Si≤1.1%;
with 0.85%≤Al+Si≤1.9%;
1.2%≤Cu≤1.9%;
S≤0.030%;
P≤0.080%;
N≤0.1%;
optionally
Nb≤0.25% and preferably comprised between 0.070 and 0.25%;
V≤0.5% and preferably comprised between 0.050 and 0.5%;
Ti≤0.5%, and preferably comprised between 0.040 and 0.5%;
Ni≤2%;
trace amounts ≤Cr≤2%, preferably ≤1%;
B≤0.010%, and preferably comprised between 0.0005% and 0.010%;

the remainder being iron and impurities resulting from the elaboration.

Preferably the composition may include 0.4%≤Al≤0.8%, 0.2%≤Si≤0.6% and/or 17%≤Mn≤18%.

Preferably, the average size of its grains is less than or equal to 5 μm.

Preferably, the surface fraction of its precipitated carbides is less than or equal to 1.5%.

It may include a Zn or Zn alloy coating obtaining by electro-galvanization.

The present invention further provides a method for manufacturing a steel plate, characterized in that:

a semi-finished product in a steel having the previous composition is elaborated and cast as a slab;
said semi-finished product is then brought to a temperature from 1,100 to 1,300° C.;
and then hot-rolling of said semi-finished product is achieved in order to obtain a hot-rolled plate, the temperature of said semi-finished product at the end of rolling being of at least 890° C.;
and then rapid quenching of said cold-rolled semi-finished product is achieved at a rate of at least 40° C./s, while observing a delay between the end of the rolling and the beginning of the quenching such that the point defined by said delay and said temperature at the end of rolling is located within an area defined by the ABCD'E'F'A preferentially ABCDEFA diagram, as shown by FIG. 1, the metal undergoing natural cooling in the open air during said delay;
and then said hot-rolled plate is wound at a temperature of less than or equal to 580° C.

According to an embodiment of the invention, said wound hot-rolled plate is unwound and at least one cold-rolling/annealing cycle is applied to it in order to obtain a cold-rolled plate.

After said cold-rolling/annealing cycle(s), cold deformation at a reduction rate of less than or equal to 30% may be applied to said cold-rolled plate.

Said cold deformation may be achieved with a method selected from work-hardening rolling, tensile leveling with alternating flexure and simple drawing.

The present invention can be used in the automotive industry of a hot-rolled or cold-rolled plate having the previous composition.

Said plate may be used under conditions which may cause corrosion under stress.

As this will have been understood, the invention includes finding a balance between the contents of the main elements Fe, Mn, Al and Cu with which it is possible to ensure both well adapted mechanical properties to the customary uses of TWIP steels and greater resistance to corrosion under stress than those of the steels of this family known up to now. In particular, it is found that Al—Cu and Al—Si pairs have particular relevance for solving this problem.

BRIEF DESCRIPTION OF THE DRAWING

The invention will be better understood upon reading the description which follows, given with reference to the FIGURE which shows a diagram showing the influence of the temperature at the end of hot-rolling and of the delay between the end of hot-rolling and the beginning of subsequent fast quenching on the recrystallized fraction after winding, for steels according to the invention.

DETAILED DESCRIPTION

The sensitivity to corrosion under stress is measured with two conventional methods, so-called "cup tests" and "creep tests."

The cup test consists of starting with a circular flat blank for example with a diameter of 55 mm, and of pressing it by means of a punch for example with a diameter of 33 mm in order to form a cup, according to methods described in WO2006/077301. In the present case, the factor which determines the severity of the test, and is determined by the ratio between the diameter of the flat blank and of the punch diameter, is 1.67. The cup, which has internal stresses following the deformation of the metal, is then immersed in pure or saline water, or in a saline mist depending on the medium, the influence of which is intended to be tested, and the number of days is measured after which cracks appear.

For the creep test, a conventional tensile test specimen is completely immersed in a pan containing salted water and then subject to a constant tensile force. The time it takes for cracks to appear due to corrosion, is observed.

The steels according to the invention should have the customary mechanical properties for this type of targeted use: a tensile strength Rm of at least 850 MPa and A % of at least 50% on a hot-rolled or cold-rolled and annealed crude plate.

Concerning the capacity of the steels of supporting corrosion under stress, the inventors applied the following criterion of their own.

They measured the durations in days after which the first crack is observed in a batch of five cups soaked in tap water (duration A), and on five cups subject to a continuous saline mist test (duration B), as well as on a tensile specimen cut out in a plate cold-rolled beforehand with a reduction of 50% and subject to a stress equal to 80% of the maximum tensile strength after 50% of reduction by cold-rolling (duration C). The stress is applied on a specimen immersed in a 5% NaCl aqueous solution.

And a quantity $\Sigma = A + 3 \times B + 4 \times C$ was then calculated. It expresses the resistance of the steel to corrosion under stress, by preferentially counter-balancing the cup test in a saline mist and the tensile test of a specimen in salted water which represent the most demanding conditions that the parts manufactured from the steel according to the invention may encounter during their use. The inventors considered that a quantity $\Sigma$ of at least 170 days has to be reached so that the steel is considered as satisfactory, from the point of its resistance to corrosion under stress.

It is generally considered that it is necessary that the minimum duration for resistance to corrosion of the cups is 90 days (tests under water) and of 13 days (tests in a saline mist). For the corrosion test under stress in salty water, it is considered that a minimum duration of resistance to corrosion of 4 days should be observed.

The experiment shows that the size criteria for grains and precipitates only have a relatively minor influence on the resistance to corrosion under stress of these steels according to the invention, the composition of which is the main characteristic. The size of the precipitates has no effect on the corrosion under stress, but only on deferred cracking. The presence of large grains may possibly be beneficial for corrosion under stress, but it will prevent obtaining the desired mechanical properties.

As for the method for producing the steels of the invention, allowing them to be provided with the desired mechanical properties, it may be fundamentally identical with those of customary practice on known Fe—Mn steels.

The method described in WO2005/019483, when it is applied to steels with a composition quite comparable with those of the invention, is well adapted. It consists of producing and casting as a slab, a semi-finished product in a steel having the prescribed composition, and then of bringing it to a temperature of 1,100-1,300° C., in order to produce on the thereby heated semi-finished product, hot deformation by rolling, with a final temperature of 890° C. or more, of producing rapid quenching of the rolled semi-finished product by spraying of water or by any other method with which a minimum quenching rate of 40° C./s may be obtained, while observing a delay between the end of the rolling and the beginning of the quenching such that the point defined by said delay and said temperature at the end of rolling is located within an area defined by the ABCD'E'F'A and preferentially ABCDEFA diagram, as shown by FIG. 1; where A (14 s, 965° C.), B (14 s, 890° C.), C (12 s, 890° C.), D (10 s, 895° C.), E (4 s, 905° C.), F (3.2 s, 965° C.), D' (10 s, 890° C.), E' (3 s, 900° C.), and F' (2 s, 965° C.). During said delay, the metal is subject to natural cooling in the open air.

The function of observing this delay is to guarantee that recrystallization of the austenite of at least 75% of the product (if it is located in the ABCD'E'F'A area) or even 100% of the product (if it is located in the ABCDEFA area) is obtained. It is at this condition that a structure of the final product is obtained, guaranteeing the desired mechanical properties, and notably a great deformation capacity.

After the quenching, the hot plate obtained at 580° C. or at a lower temperature for avoiding precipitation of iron carbides, is wound.

Typically, the thereby obtained hot-rolled plate has a thickness comprised between 0.5 and 5 mm, notably depending on the casting method used. The smallest thicknesses generally correspond to the cases when the semi-finished product was cast with a method for continuous casting of thin slabs or of thin strips directly from liquid metal.

Optionally, if a cold-rolled plate is desirably obtained, cold-rolling followed by batch-annealing or continuous annealing is applied to the hot-rolled plate after its unwinding. The annealing and following quenching conditions should however avoid the growth of grains and precipitation of iron carbides in proportions which would compromise the obtaining of the targeted mechanical properties. For example, continuous annealing carried out at 600-900° C. for 10 to 500 seconds followed by quenching at a rate of 0.5° C./s or more is well adapted to this purpose. It is also possible to carry out several of such cold-rolling/annealing cycles, in particular when small final thicknesses are desired for cold-rolled plate.

After this, it is possible to proceed with new cold deformation, at a reduction level not exceeding 30%, for example work-hardening rolling (skin-pass), tensile leveling with alternating flexure, simple drawing. This ultimate shaping, in addition that it may improve the flatness of the strip, allows an increase in its resistance to the expense of a reduction of its ductility. This reduction of ductility becomes excessive if the reduction level exceeds 30%.

The cold-rolled plate obtained typically has a thickness of the order of 0.2 mm to a few mm.

Preferably, the manufacturing method should aim at minimizing the amount of hydrogen present at the end of the treatment, in order to reduce the risk of deferred cracking, in particular when micro-alloying is practiced by adding V, Ti, Nb, Mo, W or Cr within the prescribed limits for forming adequate carbides, nitrides and/or carbonitrides. As this is known from WO2008/007192, for this purpose, it is possible to conclude the treatment by annealing carried out on the strip having its definitive thickness, or on the shaped product between 250 and 900° C. for at least 15 s. A batch-annealing carried out on the wound strip is particularly adapted for this purpose.

The plate may also undergo a coating operation with Zn or a Zn alloy, by galvanization or electrodeposition, at a moment of the production compliant with customary practice, for example before the last annealing aiming at removing hydrogen.

The contents of the different elements required by the invention will now be accounted for.

The C content is comprised between 0.6 and 0.9% and the Mn content between 17 and 22%. With this pair of contents it is possible to obtain the sought stable austenitic microstructures, determining the mechanical properties of the plate. In particular, excessive formation of iron carbides is avoided if C does not exceed 0.9%, and the formation of martensitic phases which would degrade the plate deformation capability is avoided or strongly limited if Mn exceeds 17%. The upper limit of 22% for Mn is explained by reasons related to the ductility of the plate at room temperature and to the cost of the material.

The Al content is comprised between 0.2 and 0.9%, preferably between 0.4 and 0.8%. Al is a deoxidizing element, the addition of which to Fe—C—Mn steels is common in highly variable proportions which may attain several %, but it may also be limited to a few tens of thousandths of % or even less, as this is seen in the documents from the prior art mentioned in the introduction.

It is often prescribed to limit its content to 0.050% in order to avoid excessive formation of nitrides, the risk of which is high because Mn increases the solubility of nitrogen in Fe. But the inventors noticed that this drawback may be widely counterbalanced by the provided advantage, in combination with the Cu and Si contents prescribed elsewhere, by the improvement of the resistance of the plate to corrosion under stress.

In order not to form excess nitrides, and also to avoid the formation of porosities (blowholes) by gas evolvement during the solidification of the metal, the nitrogen content should simultaneously be limited to 0.1%.

Further, Al is favorable to the increase in the stack fault energy, which reduces the risk of forming deformation martensite.

Beyond 0.9% and considering the contents of the other elements, Al has a negative influence on the corrosion under stress in salty water. For corrosion in pure water, the optimum for Al is located at about 0.4%.

The Si content is comprised between 0.2 and 1.1%, preferably between 0.20 and 0.6%. Si is also used for de-oxidation of steel (although in the present case, when the Mn and Al contents are always high, its role is minor from this point of view), and also for hardening the metal. The minimum content of 0.2% is that which is necessary so that Si begins having its effects felt on the mechanical characteristics on the one hand, is on the other hand of the order of that which will inevitably be found in the metal following addition of Mn, when the latter is achieved in the form of a silico-manganese as this is conventional (this material being less expensive and more available than ferro-manganese which may also be used for this purpose). A content of about 1% leads to optimum resistance to corrosion under stress in water, but is not very effective in a saline medium. A content comprised between 0.2 and 0.6% is the best compromise between the different requirements which may have to be satisfied by products during use, notably in the automotive field. Beyond 1.1%, there is a risk of forming martensite which would be unfavorable for the sought mechanical properties.

Moreover, experience shows that the sum Al+Si should be comprised between 0.85 and 1.9%, preferably between 1.1 and 1.6%, in order to obtain the sought effect on corrosion under stress. The explanation of this condition remains to be found.

The Cu content is comprised between 1.2 and 1.9%. Customarily, it is possible to add contents thereof up to several % in order to obtain precipitation hardening, with however the risk of promoting the occurrence of surface defects on the hot-rolled products. It is found that a content from 1.2 to 1.9%, combined with the aforementioned Al and Si contents for which it is found (especially for Si) that they provide a synergistic effect with Cu for reducing corrosion under stress of the relevant Fe—C—Mn steels, is the optimum range for solving the aforementioned technical problems.

The presence of Cu also gives the possibility of keeping a sufficiently low elastic limit so as to provide the steel with a low Re/Rm ratio, the sign of a great capacity of retaining a deformation, without any elastic return. The precipitation hardening effect usually provided by very high Cu contents is not sought here.

For the other elements which have or may be present in steel, the requirements are comparable with the usual requirements for this class of steels.

The S content is limited to 0.030% at most in order to avoid embrittlement of the grain boundaries and therefore deterioration of the ductility.

The P content is limited to 0.080% for the same reason.

The N content is less than or equal to 0.1%. Significant and uncontrolled formation of nitrides is actually detrimental to the sought mechanical properties.

As optional elements, the steel may also contain the following elements.

It may contain Cr, the content of which is limited to at most 2%, preferably at most 1%. This element may increase resistance to corrosion in aqueous media, but it also tends to reduce the stack fault energy and therefore the stability of the austenite under deformation, therefore the capability of the steel of being deformed.

It may contain Ni, the content of which is limited to 2% at most. It also increases the resistance to corrosion in aqueous media. It also contributes to obtaining a significant elongation at break and increases toughness. However, its addition proves to be unnecessarily expensive beyond 2%.

It may contain Ti, the content of which is limited to 0.5% at most. This element has a hardening action by the precipitation of carbonitrides which it causes and which trap hydrogen, but in an excessive amount, these carbonitrides will reduce toughness, which is not desired. Preferably, Ti is present at a content from 0.040 to 0.5%.

Some V may be added, up to 0.5% and preferably between 0.05 and 0.5% for the same reasons as for Ti.

Some Nb may be added, up to 0.25%, preferably between 0.070 and 0.25%, for the same reasons as for Ti.

Generally, the presence of an excessive amount of elements forming nitrides (Ti, V, Nb) will lead to the formation of coarse nitrides which will not be able to be used as effective hydrogen traps, which will further reduce the benefit of such additions.

Some B may be added, up to 0.010% and, preferably between 0.0005 and 0.010%. This element segregates at the grain boundaries and increases their cohesion. Surprisingly, the inventors noticed that addition of B in this range leads to a decrease of the order of 2.5 MPa per ppm on the elasticity limit and on the strength. Without intending to be bound to a theory, it is believed that this leads to a reduction in the residual stresses after shaping by pressing, and to better resistance to corrosion under stress of the thereby shaped parts.

The other elements present are iron and impurities resulting from production, at their usual contents for this type of steels.

Corrosion tests under stress were carried out on the cups of various compositions, either complying or not with the invention, as described in Table 1. The cups having a β factor of 1.67 were made with the method described earlier, from cold-rolled and annealed plates having undergone a treatment compliant with the one described above and with a thickness comprised between 1.2 and 1.5 mm. The creep specimens intended for determining the resistance to corrosion under traction in salted water were sampled in non-annealed cold-rolled steel plates. The body of the specimens had a width of 4 mm and a useful length of 40 mm. The results of the mechanical and corrosion tests are summarized in Table 2.

TABLE 1

Compositions of the tested samples.

| Sample | C (%) | Mn (%) | Si (%) | Al (%) | Al + Si (%) | Cu (%) | V (%) | Nb (%) | Ni (%) | B (ppm) | P (%) | S (%) |
|---|---|---|---|---|---|---|---|---|---|---|---|---|
| 1 (ref.) | 0.6 | 22 | 0.2 | 0 | 0.2 | 0 | 0.2 | 0.002 | 0.07 | 10 | 0.03 | 0.0005 |
| 2 (ref.) | 0.9 | 17 | 0.5 | 0 | 0.5 | 0 | 0.3 | 0.003 | 0.18 | — | 0.03 | 0.0006 |
| 3 (ref.) | 0.6 | 18 | 0.2 | 0.1 | 0.3 | 0.5 | 0.001 | <0.001 | 0.005 | — | 0.033 | 0.012 |
| 4 (ref.) | 0.6 | 18 | 0.2 | 0.1 | 0.3 | 1.2 | <0.001 | 0.001 | 0.008 | 10 | 0.034 | 0.01 |
| 5 (ref.) | 0.9 | 17 | 0.5 | 0 | 0.5 | 1.2 | 0.29 | <0.001 | 0.005 | — | 0.03 | 0.015 |
| 6 (ref) | 0.65 | 18 | 0.2 | 0.5 | 0.7 | 1.2 | <0.001 | <0.001 | 0.01 | — | 0.031 | 0.013 |
| 7 (ref.) | 0.6 | 18 | 0.7 | 0 | 0.7 | 1.2 | 0.001 | 0.001 | 0.005 | 10 | 0.025 | 0.01 |
| 8 (ref.) | 0.56 | 18 | 0.2 | 1.4 | 1.6 | 0 | 0.06 | 0.003 | 0.003 | 20 | 0.024 | 0.0005 |
| 9 (ref.) | 0.6 | 18 | 1.1 | 0 | 1.1 | 1.7 | <0.001 | 0.001 | 0.005 | — | 0.026 | 0.01 |
| 10 (ref.) | 0.8 | 17 | 0.5 | 1.5 | 2 | 0 | 0.29 | <0.001 | 0.01 | — | 0.035 | 0.011 |
| 11 (inv.) | 0.65 | 18 | 0.2 | 0.9 | 1.1 | 1.2 | 0.001 | 0.001 | 0.008 | — | 0.03 | 0.01 |
| 12 (inv.) | 0.9 | 17 | 0.5 | 0.8 | 1.3 | 1.7 | 0.28 | 0.001 | 0.005 | 20 | 0.03 | 0.012 |
| 13 (inv.) | 0.6 | 18 | 0.6 | 0.25 | 0.85 | 1.2 | <0.001 | 0.001 | 0.008 | — | 0.03 | 0.012 |
| 14 (inv.) | 0.6 | 18 | 1.1 | 0.5 | 1.6 | 1.7 | <0.001 | 0.001 | 0.01 | 10 | 0.029 | 0.015 |
| 15 (inv.) | 0.65 | 18 | 0.2 | 0.9 | 1.1 | 1.7 | 0.001 | 0.001 | 0.005 | 10 | 0.03 | 0.01 |
| 16 (inv.) | 0.65 | 18 | 0.2 | 0.9 | 1.1 | 1.7 | 0.001 | 0.25 | 0.005 | — | 0.03 | 0.01 |
| 17 (inv.) | 0.6 | 18 | 0.6 | 0.25 | 0.85 | 1.7 | 0.001 | 0.002 | 0.006 | — | 0.029 | 0.011 |
| 18 (inv.) | 0.6 | 18 | 1.1 | 0.5 | 1.6 | 1.7 | 0.18 | 0.001 | 0.01 | 20 | 0.029 | 0.013 |

TABLE 2

Results of corrosion tests and mechanical tests

| Sample | A Cup corrosion with tap water (days) | B Cup corrosion with a saline mist (days) | C Specimen corrosion under traction in salted water (days) | Re (MPa) | Rm (MPa) | A % | Σ = A + 3B + 4C |
|---|---|---|---|---|---|---|---|
| 1 (ref.) | 6 | 2 | 1.5 | 570 | 1150 | >50 | 18 |
| 2 (ref.) | 16 | 3 | 1.7 | 695 | 1306 | 38 | 32 |
| 3 (ref.) | 14 | 12 | 5.5 | 518 | 1089 | 60 | 72 |
| 4 (ref.) | 35 | 14 | 5.4 | 500 | 1045 | 62 | 98.6 |
| 5 (ref.) | 52 | 13 | 7.1 | 672 | 1257 | 50 | 119.4 |
| 6 (ref) | 58 | 13 | 6.8 | 474 | 989 | 69 | 124.2 |
| 7 (ref.) | 73 | 13 | 8 | 478 | 1056 | 74 | 144.12 |
| 8 (ref.) | 100 | 14 | 2.8 | 514 | 969 | 59 | 153.2 |
| 9 (ref.) | 73 | 16 | 10.6 | 495 | 1042 | 67 | 163.4 |
| 10 (ref.) | 103 | 17 | 3.9 | 712 | 1154 | 54 | 169.6 |
| 11 (inv.) | 105 | 13 | 6.8 | 478 | 949 | 67 | 171.2 |
| 12 (inv.) | 109 | 16 | 4.5 | 678 | 1133 | 58 | 175 |
| 13 (inv.) | 94 | 20 | 6.8 | 488 | 1013 | 60 | 181.2 |
| 14 (inv.) | 163 | 20 | 4.6 | 508 | 986 | 59 | 241.4 |
| 15 (inv.) | 133 | 35 | 11.1 | 476 | 913 | 64 | 282.4 |
| 16 (inv.) | 227 | 13 | 4.6 | 532 | 942 | 59 | 284.4 |
| 17 (inv.) | 150 | 36 | 8.5 | 477 | 971 | 63 | 292 |
| 18 (inv.) | 294 | 20 | 6.2 | 584 | 1028 | 57 | 378.8 |

The analysis of these results shows that it is only by observing all the conditions posed on the Si, Al and Cu contents that one obtains both the good results sought in corrosion under stress, in particular under the most severe conditions which are saline mist and salted water, and the mechanical properties making the steels of the invention adapted to their use notably in the automotive industry.

Among the reference samples, sample 10 has a resistance to corrosion in salted water, less than the required minimum value of 4 days. Further, its value of the criterion Σ=A+3×B+4×C, characterizing the overall resistance to corrosion under stress, is less than 170 days.

Generally, these tests actually show that it is necessary to observe simultaneously the four conditions:
0.2%≤Al≤0.9%;
0.2%≤Si≤1.1%;
0.85%≤Al+Si≤1.9%, preferably 1.1%≤Al+Si≤1.6%;
1.2%≤Cu≤1.9%;

so that all the objects of the invention are achieved, since one benefits from a synergistic effect between Al and Si on the one hand and between Al and Cu on the other hand on the resistance to corrosion under stress.

What is claimed is:

1. A method for manufacturing a steel plate comprising the steps of:
   obtaining a semi-finished steel product and casting the semi-finished steel product into a slab;
   heating the semi-finished steel product to a temperature ranging from 1,100 to 1,300° C.;
   hot-rolling the semi-finished steel product that results in a hot rolled plate, wherein the temperature of said semi-finished steel product at the end of rolling is at least 890° C.;

fast quenching the hot-rolled plate at a rate of at least 40° C./s, while observing a delay between the end of the rolling and the beginning of the quenching such that the point defined by said delay and said temperature at the end of rolling, is located within an area defined by a diagram ABCD'E'F'A and wherein the hot-rolled plate is cooled in the open air during said delay in order to obtain the steel plate, where:

A (14 s, 965° C.),
B (14 s, 890° C.),
C (12 s, 890° C.),
D' (10 s, 890° C.),
E' (3 s, 900° C.), and
F' (2 s, 965° C.); and winding the hot-rolled plate at a temperature of less than or equal to 580° C.;

wherein the semi-finished steel product has a composition comprising, in weight percent:

0.6%≤C≤0.9%;
17%≤Mn≤22%;
0.2%≤Al≤0.9%;
0.2%≤Si≤1.1%;
with 0.85%≤Al+Si≤1.6%;
1.2%<Cu≤1.7%;
S≤0.030%;
P≤0.080%;
N≤0.1%;
0<Nb≤0.25%;
0<V≤0.18%;
0<Ti≤0.5%;
0<Ni≤2%;
trace amounts ≤Cr≤2%; and
B≤0.010%;

a remainder being iron and impurities resulting from production of the steel plate, wherein a value of a criterion Σ=A+3×B+4×C characterizing an overall resistance of the steel plate to corrosion under stress is equal to or greater than 241.4 days, A being a duration in days after which a first crack is observed in a batch of five steel cups soaked in tap water, the five steel cups each being pressed by a punch from a circular flat blank having the composition of the semi-finished steel product, a ratio of a diameter of the circular flat blank and a diameter of the punch being 1.67, B being a duration in days after which a first crack is observed in a batch of five steel cups subject to a continuous saline mist test, the five steel cups each being pressed by a punch from a circular flat blank having the composition of the semi-finished steel product, a ratio of a diameter of the circular flat blank and a diameter of the punch being 1.67, and C being a duration in days after which a first crack is observed in a specimen subjected to a stress while immersed in a 5% NaCl aqueous solution, the specimen being cut out of a plate cold rolled beforehand with a reduction of 50% and having the composition of the semi-finished steel product, the stress being equal to 80% of a maximum tensile strength after said 50% of reduction by cold-rolling.

2. A method of manufacturing sheets for automotive use comprising:

making a structural automotive part from a hot-rolled or cold-rolled plate having a composition comprising, in weight percent:

0.6%≤C≤0.9%;
17%≤Mn≤22%;
0.2%≤Al≤0.9%;
0.2%≤Si≤1.1%;
with 0.85%≤Al+Si≤1.6%;
1.2%<Cu≤1.7%;
S≤0.030%;
P≤0.080%;
N≤0.1%;
0<Nb≤0.25%;
0<V≤0.18%;
0<Ti≤0.5%;
0<Ni≤2%;
trace amounts ≤Cr≤2%; and
B≤0.010%;

a remainder being iron and impurities resulting from production of the steel plate, wherein a value of a criterion Σ=A+3×B+4×C characterizing an overall resistance of the steel plate to corrosion under stress is equal to or greater than 241.4 days, A being a duration in days after which a first crack is observed in a batch of five steel cups soaked in tap water, the five steel cups each being pressed by a punch from a circular flat blank having the composition of the semi-finished steel product, a ratio of a diameter of the circular flat blank and a diameter of the punch being 1.67, B being a duration in days after which a first crack is observed in a batch of five steel cups subject to a continuous saline mist test, the five steel cups each being pressed by a punch from a circular flat blank having the composition of the semi-finished steel product, a ratio of a diameter of the circular flat blank and a diameter of the punch being 1.67, and C being a duration in days after which a first crack is observed in a specimen subjected to a stress while immersed in a 5% NaCl aqueous solution, the specimen being cut out of a plate cold rolled beforehand with a reduction of 50% and having the composition of the semi-finished steel product, the stress being equal to 80% of a maximum tensile strength after said 50% of reduction by cold-rolling.

3. The method according to claim 1, wherein the composition includes 0.4%≤Al≤0.8% in weight percent.

4. The method according to claim 1, wherein the composition includes 0.2%≤Si≤0.6% in weight percent.

5. The method according to claim 1, wherein the composition includes 17%≤Mn≤18% in weight percent.

6. The method according to claim 1, wherein the steel plate comprises grains having an average size less than or equal to 5 μm.

7. The method according to claim 1, wherein the steel plate comprises a surface fraction of precipitated carbides less than or equal to 1.5%.

8. The method according to claim 1, wherein the steel plate further comprises a Zn or Zn alloy coating obtained by electro-galvanization.

9. The method according to claim 1, wherein the composition comprises, in weight percent:

Nb in a range between 0.070 and 0.25%;
V in a range between 0.050 and 0.18%;
Ti in a range between 0.040 and 0.5%;
trace amounts ≤Cr≤1%; and
B in the range between 0.0005% and 0.010%.

10. The method according to claim 1, wherein the duration of B is greater than or equal to four days.

11. The method according to claim 1, wherein the duration of A is greater than or equal to 90 days.

12. The method according to claim 1, wherein the duration of C is greater than or equal to 13 days.

13. The method according to claim 1, wherein the wound hot-rolled plate is unwound, and at least one cold rolling/annealing cycle is applied to the unwound plate to obtain a cold-rolled plate.

14. The method according to claim 13, wherein after said cold rolling/annealing cycle(s), cold deformation at a reduction level of less than or equal to 30% is applied to said cold-rolled plate.

15. The method according to claim 14, wherein the cold deformation is achieved through a method of work-hardening rolling, leveling under traction with alternating flexure or simple drawing.

* * * * *